(12) United States Patent
Franzi et al.

(10) Patent No.: US 12,306,591 B2
(45) Date of Patent: May 20, 2025

(54) WATCH COMPRISING AN OPTICAL FILTERING ELEMENT

(71) Applicant: Omega SA, Biel/Bienne (CH)

(72) Inventors: Edoardo Franzi, Cheseaux-Noréaz (CH); Andrea Dunbar, Saint-Blaise (CH); Patrick Stadelmann, Boudry (CH)

(73) Assignee: OMEGA SA, Biel/Bienne (CH)

( * ) Notice: Subject to any disclaimer, the term of this patent is extended or adjusted under 35 U.S.C. 154(b) by 388 days.

(21) Appl. No.: 17/782,759

(22) PCT Filed: Dec. 9, 2020

(86) PCT No.: PCT/EP2020/085360
§ 371 (c)(1),
(2) Date: Jun. 6, 2022

(87) PCT Pub. No.: WO2021/116220
PCT Pub. Date: Jun. 17, 2021

(65) Prior Publication Data
US 2023/0004128 A1   Jan. 5, 2023

(30) Foreign Application Priority Data

Dec. 9, 2019 (EP) ..................................... 19214444

(51) Int. Cl.
*G04G 17/08* (2006.01)
*G02B 5/20* (2006.01)
*G04B 37/02* (2006.01)

(52) U.S. Cl.
CPC ........... *G04G 17/083* (2013.01); *G02B 5/208* (2013.01); *G04B 37/02* (2013.01)

(58) Field of Classification Search
CPC ....... G04G 17/083; G02B 5/208; G04B 37/02
(Continued)

(56) References Cited

U.S. PATENT DOCUMENTS

| 3,030,763 A | 4/1962 | Klingenberg |
| 2010/0053755 A1* | 3/2010 | Lee ........................ B82Y 20/00 359/577 |

(Continued)

FOREIGN PATENT DOCUMENTS

| CN | 2831192 Y | * 10/2006 |
| CN | 103616125 A | 3/2014 |

(Continued)

OTHER PUBLICATIONS

International Search Report for PCT/EP2020/085360 dated Feb. 24, 2021.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

The invention relates to a watch (2) according to the preceding claim, characterised in that it comprises a bracelet (4) and a watch case (6) including at least one electrical or electronic component (8a-8g), said watch comprising at least one Dewar device (10) configured to enclose at least one of said electrical or electronic components (8a-8g), said at least one Dewar device (10) including inner and outer walls (12a, 12b) and a vacuum or quasi-vacuum space (16) defined between these called walls (12a, 12b), the inner wall (12a) delimiting a volume (14) in which said at least one electrical or electronic component (8a-8g) is likely to be arranged, said watch (2) comprising an optical filtering element (22) defined in all or part of a particularly visible outer face of said case (6), said filtering element being capable of transmitting only the visible electromagnetic spectrum.

13 Claims, 1 Drawing Sheet

(58) Field of Classification Search
USPC .......................................................... 368/10
See application file for complete search history.

(56) References Cited

U.S. PATENT DOCUMENTS

| | | | | |
|---|---|---|---|---|
| 2014/0160904 | A1* | 6/2014 | Decoux | G04G 9/0041 |
| | | | | 368/226 |
| 2015/0355602 | A1* | 12/2015 | Wu | G04B 13/021 |
| | | | | 368/190 |
| 2017/0242402 | A1 | 8/2017 | Francois | |
| 2017/0285575 | A1* | 10/2017 | Turcotte | G04B 45/0015 |
| 2018/0063981 | A1 | 3/2018 | Park et al. | |
| 2018/0070468 | A1* | 3/2018 | Yanagisawa | H05K 5/0086 |

FOREIGN PATENT DOCUMENTS

| | | | |
|---|---|---|---|
| CN | 106325041 A | | 1/2017 |
| EP | 1 168 112 A1 | | 1/2002 |
| JP | 50-48682 U | | 5/1975 |
| JP | 56-145126 U | | 11/1981 |
| JP | 2009204577 A | * | 9/2009 |
| JP | 2018-44869 A | | 3/2018 |
| KR | 10-2017-0072287 A | | 6/2017 |
| WO | 2014/120194 A1 | | 8/2014 |
| WO | 2014/199720 A1 | | 12/2014 |

\* cited by examiner

WATCH COMPRISING AN OPTICAL FILTERING ELEMENT

CROSS REFERENCE TO RELATED APPLICATIONS

This application is a National Stage of International Application No. PCT/EP2020/085360 filed Dec. 9, 2020, claiming priority based on European Patent Application Ser. No. 19/214,444.2 filed Dec. 9, 2019.

TECHNICAL FIELD

The invention relates to a watch comprising an optical filtering element.

TECHNOLOGICAL BACKGROUND

A watch conventionally comprises a bracelet and a watch case in which a mechanical movement or even an electronic quartz movement is arranged. It is known that such movements are often very sensitive to temperature variations which can be the cause of many malfunctions as well as degradation of the preservation thereof. By way of example, an increase in temperature can cause an expansion of the materials constituting in particular the springs and the balance of a mechanical movement. Such an expansion then generates a modification of the stiffness of the spring and the inertia of the balance, which causes a change in the frequency of the mechanism. In this context, in order to avoid such malfunctions, it is known to use mechanisms for compensating for the effect of these temperature variations on the running of these movements which are not always very efficient.

It is understood that there is a need to find a solution, in particular which does not have the drawbacks of the prior art.

SUMMARY OF THE INVENTION

To this end, the invention relates to a watch comprising a bracelet and a watch case including at least one electrical or electronic component, said watch comprising at least one Dewar device configured to enclose at least one of said electrical or electronic components, said at least one Dewar device including inner and outer walls and a vacuum or quasi-vacuum space defined between these called walls, the inner wall delimiting a volume in which said at least one electrical or electronic component is likely to be arranged, said watch comprising an optical filtering element defined in all or part of a particularly visible outer face of said case, said filtering element being capable of transmitting only the visible electromagnetic spectrum.

Thanks to the presence in the watch case of at least one Dewar device which encapsulates the electrical or electronic components of the watch and of the filtering element, such components are protected from possible extreme temperatures outside which could be comprised between −150 and +125 degrees Celsius. Such a watch configuration thus allows using standard electrical or electronic components in contexts and environments where the temperatures can be extreme, such as for example space or lunar missions. This thus allows rationalising the costs as well as maintaining a reasonable complexity for the components used in the watch for such missions. In addition, the presence in the watch case of such an optical filtering element, the amount of radiant or radiative energy likely to enter the watch is greatly limited. Thus, electrical or electronic components of the watch included in the case of this watch are protected from temperatures which would be likely to damage them.

In other embodiments of this watch:
- the optical filtering element is an interferometric filter;
- the interferometric filter comprises a grid or a lattice having a mesh whose dimensions are such that they only allow certain predetermined wavelengths of the electromagnetic spectrum to pass;
- the interferometric filter comprises a plasmonic filter;
- the Dewar device is formed in all or part by the watch case and encloses at least one of said electrical or electronic components;
- the Dewar device comprises the following parts of the watch case delimiting said volume: a middle, a crystal and a bottom;
- the middle and the bottom of the case form a one-piece part, said part defining an opening opposite to the bottom which is likely to be closed by the crystal of said watch in particular in a removable manner;
- the middle and the crystal of the watch case form a one-piece part, said part defining an opening opposite to the crystal which is likely to be closed by the bottom of said watch in particular in a removable manner;
- the Dewar device comprises two thin inner and outer walls nested one inside the other, the inner wall delimiting the volume inside which the or each electrical or electronic component is arranged, the outer wall which is arranged on the outer side of the watch, the vacuum or quasi-vacuum space separating the inner wall from the outer wall;
- said at least one electrical or electronic component is selected from the group consisting of: a display device, a processor, a memory, an energy storage component, a motor, an integrated circuit and an electronic oscillator.
- the watch is a quartz watch.

BRIEF DESCRIPTION OF THE FIGURES

Other features and advantages will emerge clearly from the description given below, by way of indication and without limitation, with reference to the appended figures, in which.

DETAILED DESCRIPTION OF THE INVENTION

Figure 1:
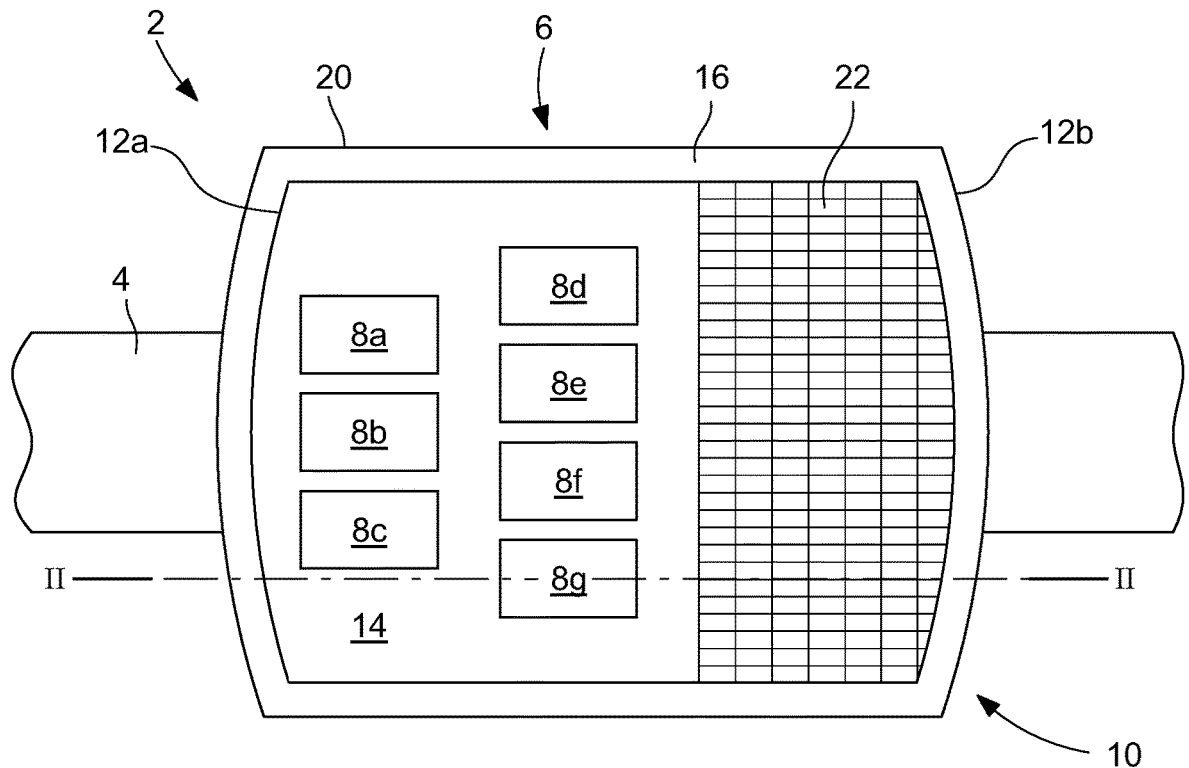
FIG. 1 is a schematic representation of a top view of a watch, a case of which comprises in particular an optical filtering element, according to one embodiment of the invention.
Figure 2:
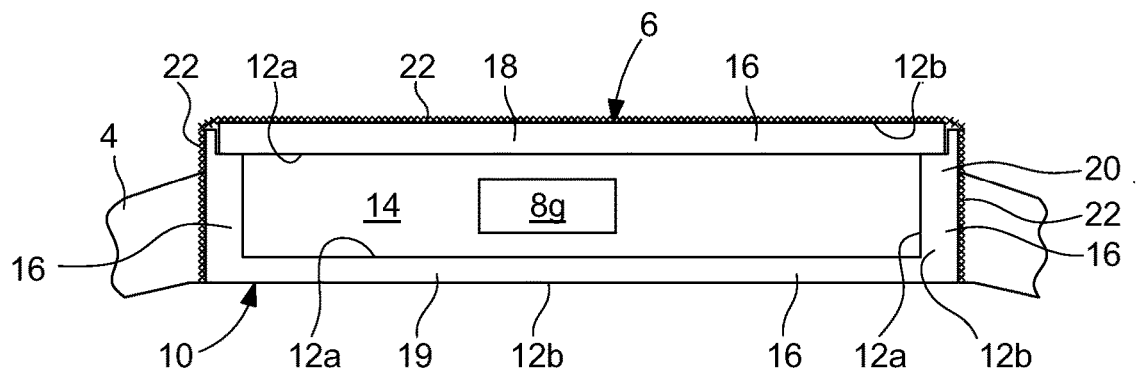
FIG. 2 is a sectional view along the axis II-II of the schematic representation of the watch of FIG. 1, according to the embodiment of the invention.

FIGS. 1 and 2 represent a watch 2 comprising a bracelet 4 and a watch case 6. Without this being limiting in the context of the present invention and for a better understanding of this invention, the watch herein is an electronic watch 2 such as a quartz watch.

In this context, the watch case 6 then includes, in a conventional manner, at least one electrical or electronic component 8a-8g. In a non-limiting and non-exhaustive manner, the watch case 6 includes seven electrical or electronic components 8a-8g which constitute sensitive portions of this watch 2. Of course, the watch case 6 can include more electrical or electronic components than those represented in these figures, or can only include a subset of components from the components 8a-8g. In these variants, the watch case 6 thus includes for example a display device 8a, a processor 8b, a memory 8c, an energy storage component 8d, a motor 8e, an integrated circuit 8f and an electronic oscillator 8g.

This watch case 6 further includes an optical filtering element 22 defined in all or part of a particularly visible outer face of said case 6, said filtering element being capable of transmitting only the visible electromagnetic spectrum. This optical filtering element 22 is preferably an interferometric filter. Such an interferometric filter is able to act as a shielding element relative to certain predetermined wavelengths of the electromagnetic spectrum. The presence of such an interferometric filter allows advantageously limiting the amount of radiative energy entering the watchcase 6.

Typically, this interferometric filter can be configured to allow only certain wavelengths of the electromagnetic spectrum to pass, for example the wavelengths located in the visible range comprised between 390 nm and 750 nm, otherwise called "visible electromagnetic spectrum", and to reflect all other wavelengths of the spectrum, in particular the wavelengths relating to infrared or microwaves. The interferometric filter can be arranged in or on one or more opaque portions of the watch case 6, or in or on one or more transparent or semi-transparent portions thereof. In the illustrative example of FIG. 1, the interferometric filter is arranged on the outer face of the watch case, namely a surface of an outer wall of the middle and an outer surface of the crystal of this watch case 6. This interferometric filter can be a grid or a lattice forming a coating which is applied on the outer face of the watch case 6. This grid or lattice has a mesh whose dimensions are such that they allow only certain predetermined wavelengths of the electromagnetic spectrum, typically the wavelengths of the visible domain, to pass. This grid or lattice acts like a Faraday cage. Alternatively, which is not represented, the interferometric filter can be a plasmonic filter.

In this watch 2, this case 6 can comprise at least one Dewar device 10. This Dewar device 10 has the same properties and features as a Dewar tube/vase well known in the state of the art. As will be seen later, the properties and features of this Dewar device 10 contribute to giving it a good thermal insulation with regard to temperatures which may prevail in the external environment in which it may be located. This device comprises a containment/encapsulation space which is herein a volume 14 defined inside this device 10 and which is provided to receive at least one of said electrical or electronic components 8a-8g so that it is thermally isolated from the external environment. This volume 14 is also called containment/encapsulation volume 14. Indeed, this Dewar device 10, by thus encapsulating these electrical or electronic components 8a-8g of the watch, participates in protecting said components 8a-8g from any extreme temperatures present outside which may be comprised between −150 and +125 degrees Celsius. In addition, it should be noted that such a configuration of the watch thus allows using standard electrical or electronic components in contexts and environments where the temperatures can be extreme, such as for example space or lunar missions. In addition, this configuration also allows rationalising the manufacturing costs of such a watch as well as maintaining a reasonable complexity for the components used in the watch for such missions.

In this watch 2, the watch case 6 therefore comprises this called at least one Dewar device 10. More specifically, the Dewar device 10 can be formed in all or part by the watch case 6. Such a Dewar device 10 is preconfigured to enclose at least one of said electrical or electronic components 8a-8g. In other words, this device 10 comprises the space 14 (or volume 14) in which each component 8a-8g can be arranged by being encapsulated in this space 14.

In a first alternative of this watch 2 visible in FIGS. 1 and 2, the Dewar device 10 can enclose all electrical or electronic components 8a-8g of the watch 2. In this context, this Dewar device 10 is then formed by parts of the watch case 6 such as the middle 20, a crystal 18 and a bottom 19. The assembly of these parts participates in producing the containment space 14, or containment volume 14, of this Dewar device 10 provided for the arrangement of the components 8a-8g. These three parts, the middle 20, the crystal 18 and the bottom 19 can be parts which are distinct and subsequently joined together to construct this encapsulation space 14 or encapsulation volume 14. In an alternative manner, the middle 20 and the bottom 19 of the box can together form a one-piece part visible in FIG. 2, said one-piece part defining an opening opposite to the bottom 19 which is likely to be closed by the crystal 18 and this, in a removable manner. In another alternative manner, the middle 20 and the crystal 18 of the watch case 6 can together form a one-piece part, said one-piece part defining an opening opposite to the crystal 18 which is likely to be closed by the bottom 19 and this, also in a removable manner. In these configurations, the space 14, or volume 14 is formed between these three parts. In this first alternative visible in FIGS. 1 and 2, this Dewar device 10 includes the inner wall formed by internal walls of the crystal 18, the bottom 19 and the middle 20, and the outer wall 12b formed by external walls of this crystal 18, this bottom 19 and this middle 20. These inner and outer walls 12a, 12b are separated by the vacuum or quasi-vacuum space 16. Furthermore, this inner wall 12a delimits the volume 14 in which the electrical or electronic components 8a-8g are likely to be arranged.

In a second alternative of this watch 2, which is not represented in the figures, the Dewar device 10 encloses at least one of the electrical or electronic components 8a-8g of the watch. In this context, this Dewar device 10 is then formed by at least two parts which are capable of cooperating together by being assembled together to form this device 10. Such parts comprise a part for partitioning the watch case 6 which may have a particular form in order to both:

define by cooperating with at least one other part of the watch case 6, a containment or encapsulation space 14 also called containment or encapsulation volume, which takes into account the volume likely to be occupied by the component(s) 8a-8g, and be able to be assembled with at least one other part of the watch case 6, such as all or part of the internal wall of the middle 20 of this case 6, or all or part of the internal wall of the bottom 19 or even to the internal wall of this bottom 19 and this middle 20.

In this second alternative, this Dewar device 10 has an inner wall 12a which is formed by an internal wall of at least one other part of the watch case 6 (the crystal 18, the bottom 19 or the middle 20) and an internal wall of the partitioning part, and the outer wall 12b is itself formed by an external wall of at least one other part (the crystal 18, the bottom 19 or the middle 20) and an external wall of the partitioning part. Also, in this alternative, these inner and outer walls 12a, 12b are separated by the vacuum or quasi-vacuum space 16. Furthermore, this inner wall 12a delimits the volume 14 in which the component(s) 8a-8g is/are likely to be arranged.

This Dewar device 10 of the watch case 6 typically comprises two thin inner and outer walls 12a, 12b nested one inside the other. An inner wall 12a of the device 10 delimits the containment/encapsulation space 14 (or containment/encapsulation volume 14) inside which each electrical or electronic component 8a-8g is arranged. An outer wall 12b of the device 10 which, according to the variants, can be arranged on the outer side of the watch 2, or on the outer side of the watch 2 and within the enclosure of the watch case. This Dewar device 10 thus defines an empty or quasi-empty space 16 which separates the inner wall 12a from the outer wall 12b. It is clearly understood herein that this space 16 is hermetically sealed and that it is under vacuum or quasi-vacuum. These walls 12a, 12b are preferably made in a non-limiting and non-exhaustive manner of a metal material, of glass or of thermosetting or thermoplastic polymer resins reinforced with carbon or glass fibres or even of ceramic materials.

It will be noted that when the inner and outer walls 12a, 12b are transparent or semi-transparent, for example by being made of glass, the outer surface of this inner wall 12a and the inner surface of this outer wall 12b can be coated with a reflective metal coating or the like, such as for example a silver layer.

In this watch 2, the crystal 18 of watch case 6 is formed of at least one transparent or semi-transparent window. When this crystal 18 is comprised in the Dewar device 10, that is to say that it participates in the formation of this device 10, it then comprises internal and external walls which are also the inner and outer walls 12a, 12b of the Dewar device 10 between which walls 12a, 12b, an empty (or vacuum) or quasi-empty (or quasi-vacuum) space 16 is therefore also defined.

In this embodiment of the invention, when the partitioning part of the watch case 6, the middle, the crystal and the bottom participate in forming the Dewar device 10, then the internal and external walls of this partitioning part, of this middle, of the crystal and of the bottom are also the inner and outer walls 12a, 12b of the Dewar device 10 of this watch 2. It is therefore understood that these internal and external walls of the partitioning part, of the middle, of the crystal and the bottom then participate in forming together the inner and outer walls 12a, 12b of the Dewar device 10.

Such a Dewar device 10 and the optical filtering element 22 thus provide the watch 2 with a very good thermal insulation relative to the external environment by preventing, by reducing or even preventing heat loss by radiation from the encapsulation volume 14. Thus, when the temperature outside the watch 2 reaches extreme values, typically in the range of −125 to +125° C., the temperature inside the encapsulation space 14 (or encapsulation volume 14) remains for its part substantially equal to the temperature of the ambient medium in which the encapsulation has been performed, typically in the range of 20° C. It is thus conceivable that such a configuration allows protecting the electrical or electronic components 8a-8g of the watch 2, and thus enabling their operation in extreme external temperature conditions.

In this watch case 6 which comprises the Dewar device 10, it will be noted that the optical filtering element 22 is defined in all or part of the outer face of the watch case 6 in particular in all or part of the visible face of said case 6. This visible face comprises the parts of the watch case 6 which are likely to be exposed to an electromagnetic radiation in particular when the watch 2 is worn by the wearer. This filtering element is defined in all or part of the outer face of the watch case, this outer face comprising the inner and outer walls 12a, 12b and the empty or quasi-empty space 16 of the Dewar device 10. This filtering element and therefore the interferometric filter can be a grid or a lattice which is comprised:

- in a first aspect on the outer surface of the inner wall 12a of the Dewar device 10, or
- in a second aspect on the outer surface of the outer wall 12b of the Dewar device 10, or
- in a third aspect on the inner surface of the inner wall 12a of the Dewar device 10, or
- in a fourth aspect on the inner surface of the outer wall 12b of the Dewar device 10, or
- in a fifth aspect in the inner wall 12a of the Dewar device 10, or
- in a sixth aspect in the outer wall 12b of the Dewar device 10, or
- in a seventh aspect in the empty or quasi-empty space 16 of the Dewar device 10, or
- according to a combination of two or more of these aspects.

The invention claimed is:

1. A watch comprising:
   a bracelet;
   a watch case including at least one electrical or electronic component;
   at least one Dewar device configured to enclose said at least one electrical or electronic components, and comprising inner and outer walls and a vacuum or quasi-vacuum space defined between the inner and outer walls, the inner wall delimiting a volume in which said at least one electrical or electronic component is arranged; and
   an optical filtering element defined in only a part of a visible outer face of said case, said filtering element being capable of transmitting only the visible electromagnetic spectrum,
   wherein the Dewar device comprises two thin inner and outer walls, the inner wall nested inside the outer wall, the inner wall delimiting the volume inside which the or each electrical or electronic component is arranged, the outer wall which is arranged on the outer side of the watch, the vacuum or quasi-vacuum space separating the inner wall from the outer wall.

2. The watch according to claim 1, wherein the optical filtering element is an interferometric filter.

3. The watch according to claim 2, wherein the interferometric filter comprises a grid or a lattice, both the grid and the lattice having a mesh with dimensions to only allow certain predetermined wavelengths of the electromagnetic spectrum to pass.

4. The watch according to claim 1, wherein the optical filtering element is an interferometric filter, the interferometric filter comprising a plasmonic filter.

5. The watch according to claim 1, wherein the Dewar device is formed in all or part by the watch case and encloses at least one of said electrical or electronic components.

6. The watch according to claim 1, wherein the Dewar device comprises the following parts of the watch case delimiting said volume: a middle, a crystal and a bottom.

7. The watch according to claim 1, wherein the Dewar device comprises the following parts of the watch case delimiting said volume: a middle, a crystal and a bottom, the middle and the bottom of this case forming a one-piece part, said part defining an opening opposite to the bottom which closed by the crystal of said watch in a removable manner.

8. The watch according to claim 1, wherein the Dewar device comprises the following parts of the watch case delimiting said volume: a middle, a crystal and a bottom, the middle and the crystal of the watch case forming a one-piece part, said part defining an opening opposite to the crystal which is closed by the bottom of said watch in a removable manner.

9. The watch according to claim 1, wherein said at least one electrical or electronic component is selected from the group consisting of: a display device, a processor, a memory, an energy storage component, a motor, an integrated circuit and an electronic oscillator.

10. The watch according to claim 1, wherein the watch is a quartz watch.

11. The watch according to claim 1, wherein the optical filtering element is defined in or on one or more opaque portions of the visible outer face of said case.

12. The watch according to claim 1, wherein the optical filtering element is defined in or on one or more transparent portions of the visible outer face of said case.

13. The watch according to claim 1, wherein the optical filtering element is defined in or on one or more semi-transparent portions of the visible outer face of said case.

* * * * *